United States Patent
Shuba

(10) Patent No.: US 7,077,098 B2
(45) Date of Patent: Jul. 18, 2006

(54) VANE-TYPE PISTON, FOUR-CYCLE MULTI-CHAMBER ROTARY INTERNAL COMBUSTION ENGINE

(76) Inventor: Yaroslav M. Shuba, Shota Rustaveli Street, 40, Apt. 16, Kiev (UA) 01023

( * ) Notice: Subject to any disclaimer, the term of this patent is extended or adjusted under 35 U.S.C. 154(b) by 314 days.

(21) Appl. No.: 10/648,862

(22) Filed: Aug. 26, 2003

(65) Prior Publication Data

US 2005/0045144 A1    Mar. 3, 2005

(51) Int. Cl.
*F02B 53/04* (2006.01)
*F01C 1/00* (2006.01)
*F02B 53/00* (2006.01)
*F02B 53/02* (2006.01)
*F04C 2/00* (2006.01)
*F04C 18/00* (2006.01)

(52) U.S. Cl. .............. 123/240; 123/231; 123/235; 123/236; 415/260; 415/264

(58) Field of Classification Search ........... 123/240, 123/231, 236, 235; 418/260, 264
See application file for complete search history.

(56) References Cited

U.S. PATENT DOCUMENTS

| | | | | |
|---|---|---|---|---|
| 939,751 | A * | 11/1909 | Schulz | 123/231 |
| 1,255,865 | A | 2/1918 | Doane | |
| 1,354,189 | A * | 9/1920 | Howitt et al. | 418/260 |
| 1,792,026 | A | 2/1931 | Nichols | 123/235 |
| 2,511,441 | A | 6/1950 | Loubiere | |
| 2,672,282 | A * | 3/1954 | Novas | 418/264 |
| 3,549,289 | A * | 12/1970 | Skagen | 418/260 |
| 3,568,645 | A * | 3/1971 | Grimm | 418/264 |
| 3,951,112 | A | 4/1976 | Hunter | |
| 3,955,540 | A | 5/1976 | Blanchard | |
| 3,964,447 | A | 6/1976 | Normandin | |
| 4,018,191 | A | 4/1977 | Lloyd | 123/243 |
| 4,212,603 | A * | 7/1980 | Smolinski | 418/264 |
| 4,422,419 | A | 12/1983 | Umeda | |
| 4,515,123 | A | 5/1985 | Taylor | |
| 4,667,468 | A | 5/1987 | Hansen | 418/186 |
| 4,848,296 | A | 7/1989 | Lopez | |
| 5,277,158 | A | 1/1994 | Pangman | |
| 5,423,297 | A | 6/1995 | Roberts | |
| 6,070,565 | A | 6/2000 | Miniere | |
| 6,247,443 | B1 | 6/2001 | Pelleja | |
| 6,250,279 | B1 | 6/2001 | Zack | |
| 6,539,913 | B1 | 4/2003 | Gardiner | 123/236 |
| 6,684,847 | B1 * | 2/2004 | Al-Hawaj | 123/243 |
| 6,766,783 | B1 * | 7/2004 | Person et al. | 123/236 |
| 2002/0007815 | A1 * | 1/2002 | Oh et al. | 123/236 |

* cited by examiner

FOREIGN PATENT DOCUMENTS

DE    3108087 A1 *  9/1982  ................. 123/240

*Primary Examiner*—Thai-Ba Trieu

(57) ABSTRACT

A rotary internal combustion engine has a hollow stator with inner surface formed by two concentric cylindrical surfaces, which fluently transit one into the other via ramp surfaces, and a cylindrical rotor, having the same radius as smaller concentric surface of the stator. The rotor has vanes that move radially within the rotor tightly contouring the inner surface of the stator during rotor rotation. The cavities within the stator where its inner radius equals that of the rotor constitute combustion chambers, which connect to the variable-volume working chambers formed by outer surface of the rotor, inner surface of the stator with bigger radius and the side of the vane via valve-controlled orifices ending in the areas of the stator ramp surfaces. During rotor rotation the vanes provide compression of fuel mixture into combustion chambers and accept the energy of expanding gasses following fuel mixture ignition in the combustion chamber.

5 Claims, 4 Drawing Sheets

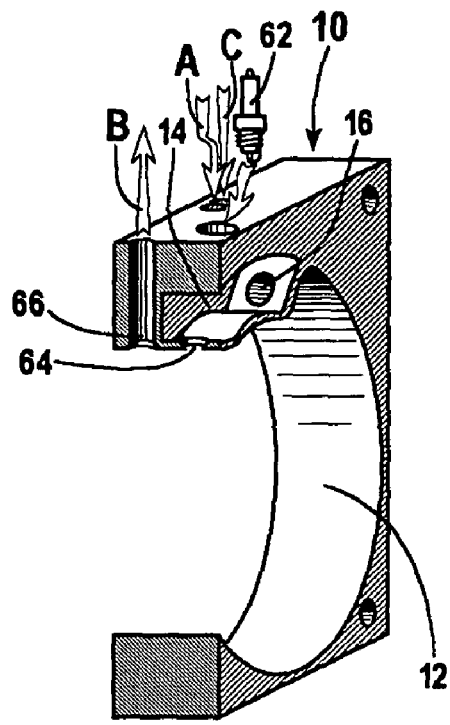
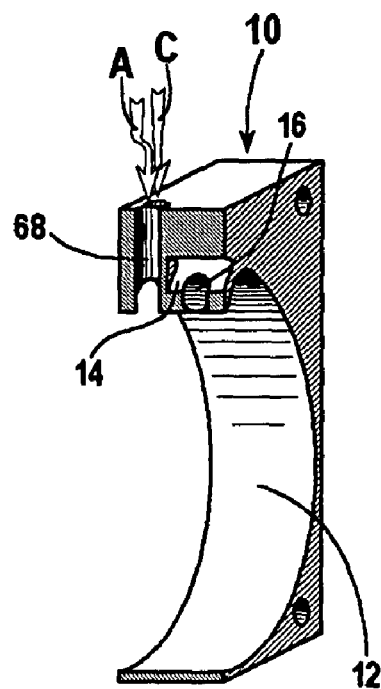
Fig. 3                Fig. 4
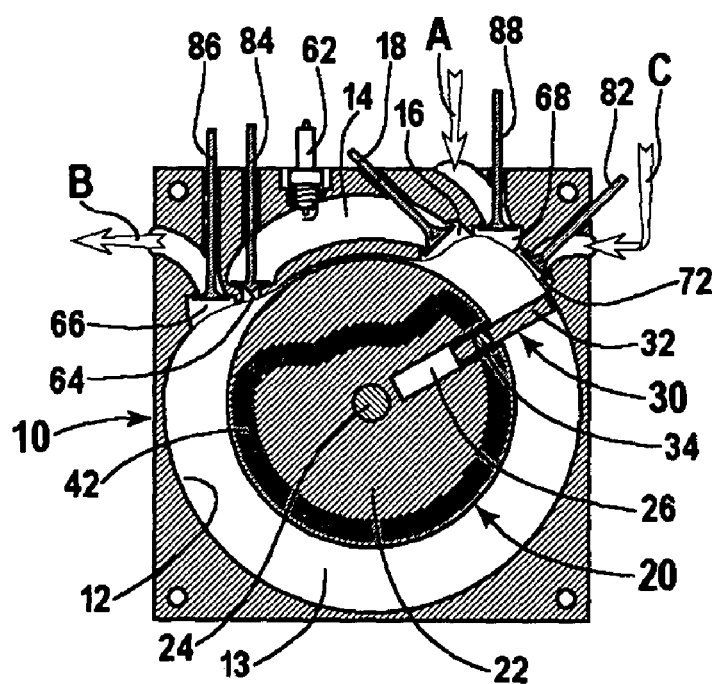
Fig. 5

VANE-TYPE PISTON, FOUR-CYCLE MULTI-CHAMBER ROTARY INTERNAL COMBUSTION ENGINE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The invention relates to internal combustion engines, in particular to true rotary engines in which the energy of combusted gases directly drives rotation of the rotor and whose working members rotate around an axle fixed on a rotor.

2. Discussion of Prior Art

The drawbacks of a conventional internal combustion engine, in which reciprocal movements of the pistons are translated into rotation of a crankshaft via special transduction means, are well known. The major ones are: 1) low efficiency coefficient due to losses on friction of slide between pistons and cylinders walls and transduction of reciprocal-to-rotational motion; 2) excessive vibrations due to imbalances in the whole piston—transduction mechanism—crankshaft system; 3) big weight. The real alternative to the conventional reciprocal internal combustion engine (CICE) is rotary internal combustion engine (RICE), in which the energy of expanding gasses directly drives the rotation of the shaft.

Many models of RICE have been proposed and patented. The search of only full-text U.S. Patent Database (patents from 1976 to present) with the patent's title words query "(((rotary AND internal) AND combustion) AND engine)" resulted in 319 hits, of which about 80% represent new technical solutions. The data on technical testing of the acting prototypes for the most patented RICE models is not available. However, it seems that limited or questionable benefits offered by existing technical solutions of the RICE so far do not justify mass production of any of them, and replacement of the CICE. Most existing models apparently suffer either from excessive complexity translatable into high weight and cost of production or do not provide notable gains in the efficiency coefficient due to inability to reduce leak of gasses among working members. The most advanced model of RICE in terms of industrial elaboration is Wankel engine. The rotor in this type of engine has three convex facets and rotates eccentrically within cylindrical stator with peritrochoidal inner surface. However, this model still suffers from problems in pressurization of the combustion chamber, insufficient durability of compression elements, poor fuel efficiency especially at low loads and enhanced emission of carbohydrates.

The present invention most closely relates to the vane-type RICE, in which the energy of combusted gasses drives rotation of the rotor via interaction with the vane(s) disposed on the rotor, and thereby is the most effective in terms of energy conversion efficiency. To create working chambers of variable volume required for performing gas compression and expansion cycles the prior arts took advantage of eccentric disposition of the rotor within cylindrical stator (U.S. Pat. No. 1,255,865, NPC 123/235, February 1918; U.S. Pat. No. 2,511,441, NPC 123/235, June 1950, U.S. Pat. No. 3,951,112, NPC 123/242, April 1976; U.S. Pat. No. 3,955,540, NPC 418/260, May 1976; U.S. Pat. No. 3,964,447, NPC 123/236, June 1976; U.S. Pat. No. 4,422,419, NPC 123/235, December 1983; U.S. Pat. No. 4,848,296, NPC 123/242, July 1989; U.S. Pat. No. 6,247,443, NPC 123/229, June 2001) or concentric disposition of the rotor within the stator having peritrochoid/ellipsoid-like (U.S. Pat. No. 4,018,191, NPC 123/243, April 1977; U.S. Pat. No. 4,667,468, NPC 123/248, May 1987; U.S. Pat. No. 5,277,158, NPC 123/243, January 1994; U.S. Pat. No. 6,539,913, NPC 123/231, April 2003) or specially shaped (U.S. Pat. No. 1,792,026, NPC 123/235, February 1931; U.S. Pat. No. 4,515,123, NPC 123/222, May 1985; U.S. Pat. No. 5,423,297, NPC 123/213, June, 1995; U.S. Pat. No. 6,070,565, NPC 123/231, June 2000) inner surface together with the vanes movable in radial slots within the rotor while sealingly engaged with the surface of the stator.

However in many types of vane-type rotary engines the structure is complex due to many components and tangled intrinsic system of gas conduits, and thus manufacturing costs may become high. The reliability and durability of gas sealing mechanisms in existing technical solutions also remains the matter of concern. Thus, simple and yet reliable model of RICE that would attract manufactures attention still remains a priority.

SUMMARY

A very simple four-cycle, multi-chamber rotary internal combustion engine that includes a hollow stator with inner surface formed by two concentric cylindrical surfaces which fluently transit one into the other via ramp surfaces, and a cylindrical rotor, having same radius as smaller concentric surface of the stator, with a vane-type pistons that can freely move in radial direction within radial rectangular grooves in the rotor and having means allowing their outer facet to tightly contour the inner surface of the stator during rotation of the rotor is disclosed. The cavities within the stator made in the areas where the inner surface of the stator has the same radius as that of the rotor form combustion chambers, which connect to the working chambers formed between outer surface of the rotor and inner surface of the stator with bigger radius via the orifices ending within the portions of the ramp surfaces of the stator. Timely connections among combustion and working chambers during compression and power cycles are regulated by a conventional valve system.

BRIEF DESCRIPTION OF THE DRAWINGS

Various other objects, features and attendant advantages of the present invention will be more fully appreciated and the same becomes better understood from the following detailed description when considered in connection with the accompanying drawings in which like reference characters designate like or corresponding parts throughout the several views and wherein:

FIG. 3 shows a transverse section of the engine's stator taken in 3—3 plane in FIG. 2 in the area of the exhaust and compression orifices/conduits. Not to overload the image the valves are not depicted.

FIG. 4 shows a transverse section of the engine's stator taken in 4—4 plane in FIG. 2 in the area of the intake and power orifices/conduits. Not to overload the image the valves are not depicted.

FIG. 5 is an enlarged diagrammatic cross sectional view taken through the engine with arbitrary piston position during the rotation of the rotor. The gases conduits, their orifices and valves are diagrammatically shown side by side in one plane to better illustrate their relative operation, whereas if shown as they appear in the drawing of FIG. 2, no cross section would show all of them, and their simultaneous operation could not be seen. The guiding grove for the piston is illustrated with closely spaced hatching. All valves are shown in the closed positions.

DETAILED DESCRIPTION OF THE INVENTION

Objects and Advantages

Figure 1:
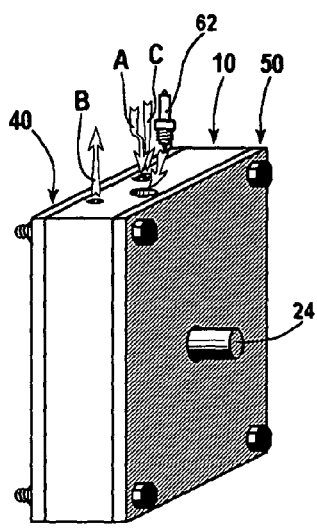
FIG. 1 shows a prospective view of the assembled engine of the present invention. The arrows A, B and C represent different gas flows as they are related to specific parts of the engine shown in this and other figures.
Figure 2:
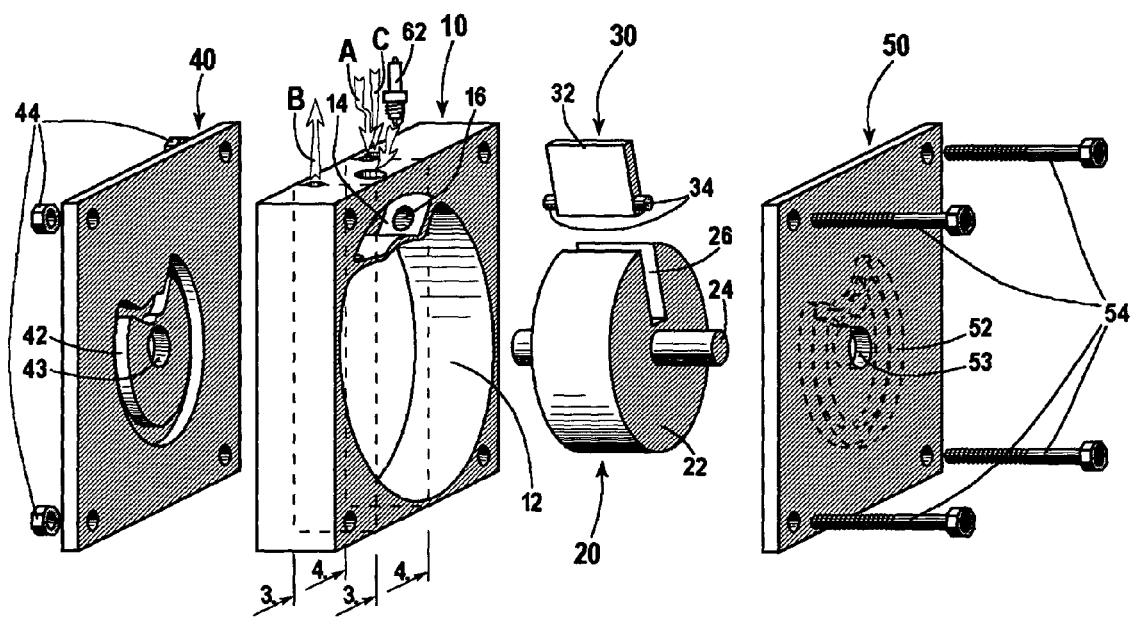
FIG. 2 shows an exploded perspective view of the engine. Not to overload the image the valves are not depicted.
Figure 6:
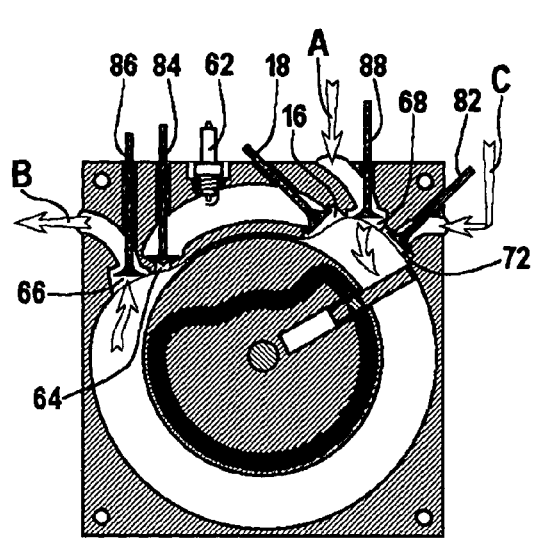
FIGS. 6–9 show similar cross sectional view to that of FIG. 5, but corresponding to the valves positions during intake (FIG. 6), compression (FIG. 7), power (FIG. 8) and exhaust (FIG. 9) cycles. Piston positions are shown arbitrary at each cycle during the revolution of the rotor. The arrows inside the engine show gas flows during each cycle.
Figure 7:
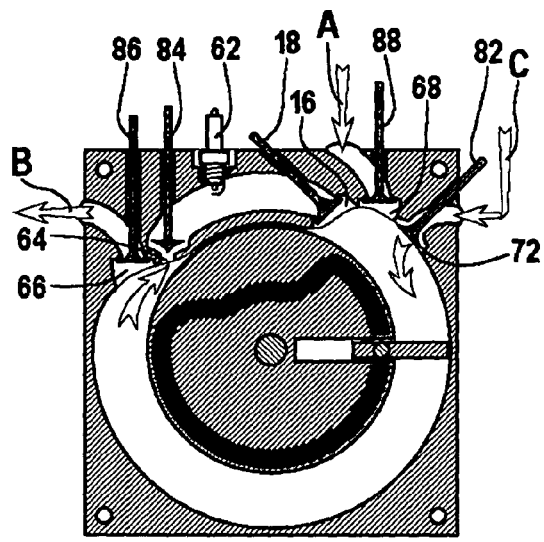
Figure 8:
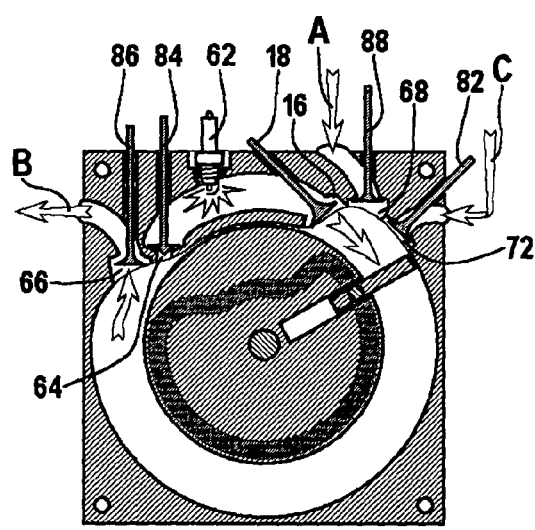
Figure 9:
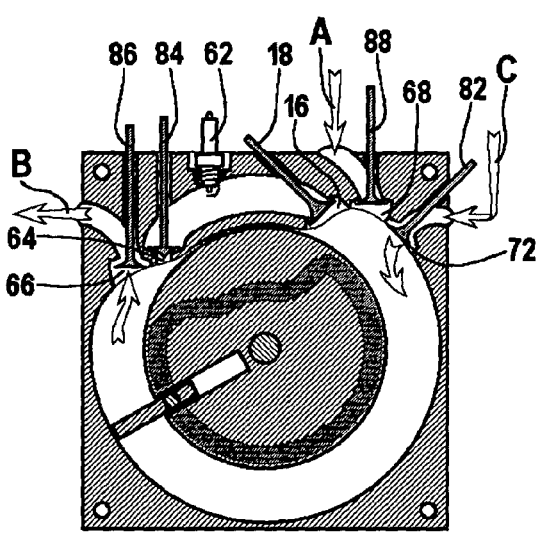

The object of the invention is to create simple RICE with minimum parts and lack of radial constituent of force of expanding gasses applied to a piston providing high torque on engine rotor.

This object is attained in that in RICE comprising the vane-type piston that is moving in radial direction within a radial groove made in a cylindrical rotor along its whole length (height). The rotor being positioned in a cylindrical body of a stator whose inner surface is arranged of two concentric surfaces, of which the one with smaller radius has the same radius as that of the rotor, and transitions between two concentric surfaces are arranged with ramp surfaces. This object is also attained in that the piston is provided by a means allowing it to tightly contour with its outer facet the inner surface of the stator ensuring gas sealing from its both sides. A cavity within the stator made in the area where the inner surface of the stator has the same radius as that of the rotor form a combustion chamber. A space between ramp surfaces of the stator and side planes of the piston form working chambers, which are connected to the combustion chamber, intake and exhaust systems via valve-controlled orifices.

One of possible solutions for the mechanism allowing radial movement of the piston in a manner that its outer facet tightly contours the inner surface of the stator, preventing leak of gasses between working chambers formed on both sides of the piston, is creating a guiding grooves, concentric with the whole system, in lids that form the bases of the cylindrical body of the engine that mimic the inner surface of the stator, and providing the piston with a lugs that move in the guiding groves.

The engine can be made as one unit with up to four combustion chambers or as an assembly of several units each with single combustion chamber.

In the simplest embodiment with one combustion chamber one complete revolution of the rotor performs one complete cycle of a four-stroke engine.

Preferred Embodiment—FIGS. 1–5

Major parts of the proposed invention are presented on FIG. 1, FIG. 2, FIG. 3, FIG. 4 and FIG. 5. A rotary internal combustion engine comprises a rotor 20 having a cylindrical body 22 sitting on a shaft 24. The cylindrical body of the rotor has a radial grove 26 made along its whole height. The grove of the rotor houses a piston 30 having a rectangular body 32 whose height equals the depth of the groove 26, length equals the height of the cylindrical body of the rotor and width equals the width of the grove. The piston can freely move in radial direction within the grove of the rotor. In current version of the engine design the piston is provided with a cylindrical lugs 34 on its sides facing the bases of the rotor as part of the mechanism that allows radial motion of the piston. The rotor 20 with the piston 30 is mounted within a prism-shape stator 10 of the same height as that of the rotor concentrically to its inner cylindrical surface 12 with the help of a two side cover lids 40 and 50 having openings 43 and 53 for the rotor's shaft 24 concentric to the rotor and to the inner surface of the stator. The surfaces of the side cover lids 40 and 50 facing the stator's interior have an annular guiding grooves 42 and 52 into which the lugs 34 of the piston 30 fit to form one probable mechanism that allows radial motion of the piston during rotation of the rotor 20. The shape of the guiding groove has to be made such that it would provide tight contouring of the inner surface 12 of the stator 10 by the piston's body 32 outer facet. Whole assembly of the rotor 20, piston 30, stator 10, lids 40 and 50 is secured by bolts 54 and nuts 44.

The diameter of the inner cylindrical surface 12 of the stator 10 has to be such that to ensure secure positioning of the piston 30 within the groove 26 of the rotor 20 while the piston is pulled out in radial direction from the grove to be pressed with its outer edge against the inner surface of the stator. Within the short distance on the perimeter of the inner cylindrical surface 12 of the stator 10 its diameter is made equal to that of the cylindrical body 22 of the rotor 20, and the inner surface with smaller diameter smoothly transits to the surface with bigger diameter with surface ramps. In the area where the diameter of the inner cylindrical surface 12 of the stator 10 equals that of the cylindrical body 22 of the rotor 20 a cavity, which forms a combustion chamber 14 is made within the body of the stator 10. The combustion chamber 14 is connected to the working chamber 13 of the engine formed between the outer surface of the cylindrical body 22 of the rotor 20 and the inner cylindrical surface 12 of the stator 10 with bigger diameter via a compression orifice 64 and power orifice 16 made in the ramp areas of the inner surface 12 of the stator 10 and controlled by a compression valve 84 and a power valve 18, respectively (see FIG. 5). A spark-plug 62 faces the volume of the combustion chamber 14.

A fuel intake conduit/orifice 68, controlled by an intake valve 88, made within the body of the stator 10 in the immediate vicinity to the power orifice 16, connects fuel injection system A to the working chamber 13 of the engine formed between the outer surface of the cylindrical body 22 of the rotor 20 and the inner cylindrical surface 12 the stator 10 with bigger diameter.

An exhaust conduit/orifice 66, controlled by an exhaust valve 86, made within the body of the stator 10 in the immediate vicinity to the compression orifice 64, connects the working chamber 13 of the engine formed between the outer surface of the cylindrical body 22 of the rotor 20 and the inner cylindrical surface 12 the stator 10 with bigger diameter to the exhaust system B.

An ambient conduit/orifice 72, controlled by an ambient valve 82, made within the body of the stator 10 in the immediate vicinity to the power orifice 16, connects atmospheric ambience C to the working chamber 13 of the engine formed between the outer surface of the cylindrical body 22 of the rotor 20 and the inner cylindrical surface 12 the stator 10 with bigger diameter to balance the pressure on one of the piston's 30 side.

The valves 18, 82, 84, 86, 88 must be operated by the mechanisms that provide the necessary timing of physical connection among various chambers during engine operation.

Two or more engines are easily arranged as an integral unit. In this case the side cover lids (i.e., 40 or 50), which separate the engines will have to be made double-sided (i.e. with 42-like guiding grooves on both sides) and the shafts 24 of the rotors 20 facing each other have to be provided with fitting and connecting mechanism.

Operation of Invention—FIGS. 6–10

The engine operates in the following manner (see FIG. 6, FIG. 7, FIG. 8, FIG. 9, FIG. 10):

The rotor 20 during engine operation rotates clockwise. The first, suction cycle (FIG. 6) starts when the piston body 32 has just passed the intake orifice 68. At this point the intake valve 88 opens whereas the exhaust valve 86 remains open from previous (fourth) cycle. The depression created on the side of the piston body 32 facing the intake orifice 68 during clockwise rotation of the rotor 20 helps to suck in the fuel mixture A into the working chamber 13 whereas the excessive positive pressure created on the side of the piston body 32 facing the exhaust orifice 66 is dissipated via the open exhaust gas conduit B. Immediately after the piston body 32 enters the region underneath the combustion chamber 14 (see FIG. 10 for consecutive positions of the piston 30 during contouring the combustion chamber 14) both the intake valve 88 and the exhaust valve 86 close, and the fuel mixture remains locked in the working chamber 13.

Figure 10:
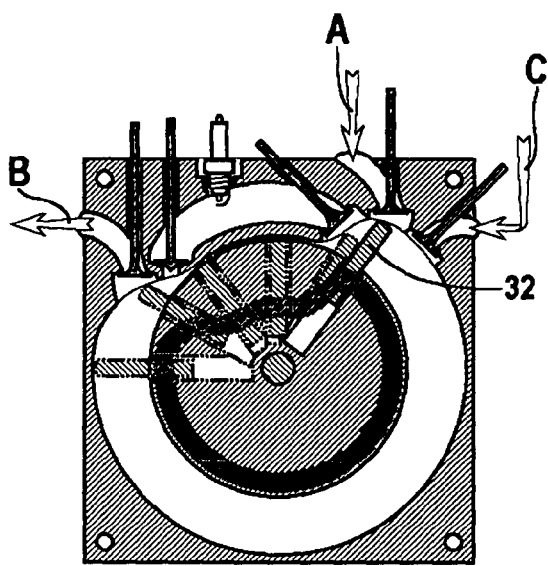
FIG. 10 shows similar cross sectional view to that of FIG. 5, but illustrating consecutive positions of the piston during rotational stages of the rotor corresponding to the contouring by the piston of the inner surface of the stator in the area of the combustion chamber. All valves are shown in the closed positions.

The second, compression cycle (FIG. 7) starts when the piston body 32 exits the region underneath the combustion chamber 14 (see FIG. 10 for consecutive positions of the piston 30 during contouring the combustion chamber 14). At this time the compression valve 84 opens the compression orifice 64 into the combustion chamber 14. The excessive positive pressure created on the side of the piston body 32 facing the compression orifice 64 helps to drive the fuel mixture from the working chamber 13 into the combustion chamber 14. Immediately after the piston body 32 passes the ambient orifice 72 during clockwise rotation of the rotor 20 the ambience valve 82 opens as well helping to dissipate the depression created on the side of the piston body 32 facing the ambient orifice 72 by letting the atmospheric ambient air C into the working chamber 13. Immediately after the piston body 32 during clockwise rotation of the rotor 20 passes the compression orifice 64 and enters the region underneath the combustion chamber 14 (see FIG. 10 for consecutive positions of the piston 30 during contouring the combustion chamber 14) the compression valve 84 as well as the ambient valve 82 close. At the end of the second, compression cycle the compressed fuel mixture remains locked in the combustion chamber 14, whereas the working chamber 13 remains filled with ambient air at atmospheric pressure.

The third, power cycle (FIG. 8) starts when the piston body 32 exits the region underneath the combustion chamber 14 (see FIG. 10 for consecutive positions of the piston 30 during contouring the combustion chamber 14) and just passes the power orifice 16. At this time the power valve 18 opens and synchronously the spark-plug 62 ignites the compressed fuel mixture in the combustion chamber 14. Expanding combusted gases exit through the power orifice 16 from the combustion chamber 14 to the working chamber 13 and apply force to the side of the piston body 32 that faces power orifice 16 providing thereby the torque to the rotor 20 in the clockwise direction. It would be advantages to have ramp surface containing power orifice 16 controlled by power valve 18 maximally parallel to the radial plane (i.e., to the side surface of the piston 32) to permit immediate near full extension of the piston 32 upon exit from the region underneath the combustion chamber 14 before ignition of the fuel mixture in the combustion chamber 14 in order to provide near maximal torque right from the beginning of the power cycle. At the beginning of the power cycle the exhaust valve 86 opens as well letting the atmospheric air B, working chamber 13 was filled in, through the exhaust orifice/conduit 66 out of the working chamber dissipating thereby the excessive positive pressure created on the side of the piston body 32 facing the exhaust orifice 66. Immediately after the piston body 32 during clockwise rotation of the rotor 20 enters the region underneath the combustion chamber 14 (see FIG. 10 for consecutive positions of the piston 30 during contouring the combustion chamber 14) the power valve 18 closes. At the end of the third, power cycle the combustion chamber 14, as well as working chamber 13 are filled with burned fuel gases.

The last, fourth exhaust cycle (FIG. 9) starts when the piston body 32 exits the region underneath the combustion chamber 14 (see FIG. 10 for consecutive positions of the piston 30 during contouring the combustion chamber 14) and just passes the ambient orifice 72. At this time the ambient valve 82 opens whereas the exhaust valve 66 still remains open from the previous cycle. The excessive positive pressure created on the side of the piston body 32 facing the exhaust orifice 66 during clockwise rotation of the rotor 20 drives burned gasses B through the exhaust orifice/conduit 66 to the exhaust system whereas open ambient valve 82 lets atmospheric air C into the working chamber 13 through the ambient orifice/conduit 72 to compensate for the depression created on the side of the piston body 32 facing the ambient orifice 72. Immediately after the piston body 32 during clockwise rotation of the rotor 20 enters the region underneath the combustion chamber 14 (see FIG. 10 for consecutive positions of the piston 30 during contouring the combustion chamber 14) the ambient valve 82 closes. At the end of the fourth, exhaust cycle the working chamber 13 becomes filled with atmospheric air at normal pressure and the combustion chamber 14 remains filled with the remnant of burned fuel gases.

Now the cycles are repeated by going to the first, intake cycle.

Figure 11:
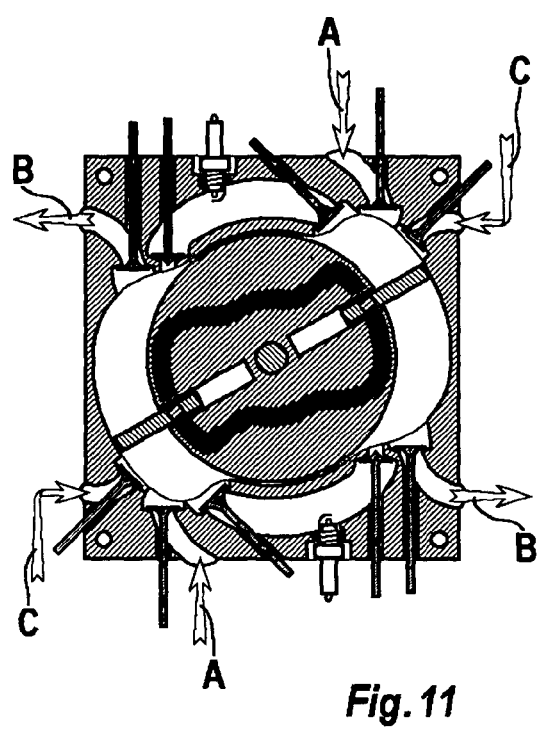
FIG. 11 shows similar cross sectional view to that of FIG. 5, but illustrating the modification of the engine with two pistons and two combustion chambers. The pistons are at arbitrary positions, and all valves are shown in the closed positions.

Alternative Embodiments—FIG. 11.

The proposed engine instead of one piston, one combustion and one working chamber can be made with up to four of each. FIG. 11 shows an example with two pistons, two combustion and two working chambers. In the event of multiple pistons/chambers in each part of the engine specific engine cycle is performed.

CONCLUSION, RAMIFICATIONS, AND SCOPE OF INVENTION

Thus the reader will see that the RICE of the invention has simple design with minimum parts ensuring low cost of production, and provides the most effective interaction of expanding gases with the piston the force of which is directed exclusively tangential to the rotor generating thereby high torque.

While my above description contains many specificities, these should not be construed as limitations on the scope of the invention, but rather as an exemplification of one preferred embodiment thereof. This especially relates to the design of the system providing tight contouring of the stator's inner surface 12 by the outer facet of the piston body 32. For example, the shape of the guiding groove 42 and 52 for the piston 30 can be made less curved if it is combined with the variable length piston body 32 (i.e. piston body 32 consisting of two resiliently connected with each other parts). Moreover, because of lack of radial constituent of the force of expanding gases applied to the piston it can be constantly kept pressed against the inner surface 12 of the stator 10 by means of springs only placed in the grove 26 of the rotor underneath the piston body 32. In this case the need in the guiding grooves 42 and 52 and in the piston lugs 34 may be circumvented at all. To permit adjusting of the shape of the pistons outer facet to the variable curvature of the inner surface 12 of the stator 10 the piston body 32 or part of it can be made not from the solid piece of metal, but be assembled from the independently moving plates. Such piston design will also help for better pressurizing compartments on both sides of the piston and prevent leak of gasses between them.

Accordingly, the scope of the invention should be determined not by the embodiment(s) illustrated, but by the appended claims and their legal equivalents.

What I claim as my invention is:

1. A four-cycle, multi-chamber rotary internal combustion engine, comprising:
    a stator having a right-prism-shape exterior body and a hollow core formed by two concentric cylindrical surfaces which fluently transit one into the other via a ramp surface; wherein the ramp surface being generally parallel to a radial plain of the stator;
    a rotor having a cylindrical body of the same height as of said stator and an external diameter corresponding to a diameter of a smaller concentric surface forming the hollow core of said stator;
    wherein said rotor has at least one radial rectangular groove along the rotor whole height;
    at least one vane-type piston having a rectangular body with the same height as of said rotor and being positioned in said at least one radial rectangular groove of said rotor;
    wherein said at least one vane-type piston is provided with a means of moving in a radial direction within said grooves of said rotor with an outer face tightly contouring an inner surface of said stator;
    said rotor being positioned in said stator concentrically to cylindrical surfaces forming the hollow core thereof, and at least one side cover lid of said stator.

2. The four-cycle, multi-chamber rotary internal combustion engine as claimed in claim 1, further comprising a cavity within the stator wherein a radius of the inner surface of the stator is the same as a radius of the rotor, forms a combustion chamber.

3. The four-cycle, multi-chamber rotary internal combustion engine as claimed in claim 2, wherein a space between an outer surface of the rotor and the inner surface of the stator with a bigger radius form a working chamber.

4. The four-cycle, multi-chamber rotary internal combustion engine as claimed in claim 3, wherein said combustion chamber is connected with said working chamber via openings in an area of the ramp surfaces connecting the two concentric cylindrical surfaces of said stator;
    wherein timing of compressed fuel mixture between said combustion chamber and said working chamber is controlled by valves.

5. The four-cycle, multi-chamber rotary internal combustion engine as claimed in claim 4, wherein fuel mixture and exhaust gasses in and out of said working chamber is controlled by an intake valve and an exhaust valve positioned nearby an opening of a power valve and an opening of compression valve, connecting said combustion chambers and said working chambers.

* * * * *